United States Patent [19]

Vachon et al.

[11] Patent Number: 5,065,331

[45] Date of Patent: * Nov. 12, 1991

[54] APPARATUS AND METHOD FOR DETERMINING THE STRESS AND STRAIN IN PIPES, PRESSURE VESSELS, STRUCTURAL MEMBERS AND OTHER DEFORMABLE BODIES

[76] Inventors: Reginald I. Vachon, 1414 Epping Forest, Atlanta, Ga. 30319; William F. Ranson, 138 Irwin Rd., Lexington, S.C. 29072

[*] Notice: The portion of the term of this patent subsequent to May 27, 2003 has been disclaimed.

[21] Appl. No.: 886,747

[22] Filed: May 27, 1986

Related U.S. Application Data

[63] Continuation-in-part of Ser. No. 767,663, Aug. 21, 1985, Pat. No. 4,591,996, which is a continuation of Ser. No. 264,445, May 19, 1985, abandoned.

[51] Int. Cl.$^5$ .......................................... G01B 11/16
[52] U.S. Cl. .................................. 364/508; 356/35.5; 356/360; 73/800
[58] Field of Search .................. 364/506–508, 364/550, 552, 525, 551.01; 358/106, 107; 73/800; 356/32, 35.5, 345, 354, 355, 359, 360

[56] References Cited

U.S. PATENT DOCUMENTS

| | | | |
|---|---|---|---|
| 3,828,126 | 8/1974 | Ramsey, Jr. | 358/106 |
| 3,844,659 | 10/1974 | Baganoff | 356/32 |
| 3,889,053 | 6/1975 | Lloyd et al. | 358/106 |
| 4,018,531 | 4/1977 | Leendertz | 356/360 |
| 4,280,764 | 7/1981 | Sica, Jr. et al. | 356/35.5 |
| 4,288,852 | 9/1981 | Holland | 364/508 |
| 4,322,162 | 3/1982 | McKelvie et al. | 356/35.5 |
| 4,352,565 | 10/1982 | Rowe et al. | 356/360 |
| 4,433,385 | 2/1984 | De Gasperi et al. | 358/106 |
| 4,591,996 | 5/1986 | Vachon | 364/508 |
| 4,598,420 | 7/1986 | Harvey | 364/508 |

OTHER PUBLICATIONS

"Noncontact Method of In-Plane Strain Measurement on Rotating Structures", by Preater; SPIE vol. 236, 1980 European Conference on Optical Sys. and Applications; pp. 58–62.

"Stress Analysis of In-plane Vibration of 2-D Structure by a Laser Speckle Method", by Chiang et al., Applied Optics, vol. 19, No. 16, Aug. 15, 1980; pp. 2705–2708.

"The Design and Application of a Speckle Pattern Interferometer for Total Plane Strain Field Measurement", by Jones; Optics and Laser Tech., vol. 8, No. 5, Oct. 1976, pp. 215–219.

"Laser Speckle Photography and the Submicron Measurement of Surface Deformations on Engineering Structures", by Gregory; NDT International, vol. 12, No. 2, Apr. 1979, pp. 61–70.

Primary Examiner—Gary Chin
Attorney, Agent, or Firm—Fleit, Jacobson, Cohn, Price, Holman & Stern

[57] ABSTRACT

An apparatus and method of measuring and analyzing the deformation of deformable bodies which includes a source of an electromagnetic or accoustical signal emitted from a deformable body which can be received and analyzed so that the signal can be analyzed when the body is in a reference state with the signal being subsequently analyzed when the body is undergoing or has undergone deformation with the reference state signal and deformation state signal being compared and analyzed to provide significant information with respect to various characteristics of the body.

6 Claims, 2 Drawing Sheets

APPARATUS AND METHOD FOR DETERMINING THE STRESS AND STRAIN IN PIPES, PRESSURE VESSELS, STRUCTURAL MEMBERS AND OTHER DEFORMABLE BODIES

CROSS-REFERENCE TO RELATED APPLICATION

This application is a continuation-in-part of copending application U.S. Ser. No. 767,663, filed Aug. 21, 1985 now U.S. Pat. No. 4,591,996 issued May 27, 1986, which was a continuation of U.S. Ser. No. 264,445, filed May 18, 1981 abandoned for APPARATUS AND METHOD FOR DETERMINING STRESS AND STRAIN IN PIPES, PRESSURE VESSELS, STRUCTURAL MEMBERS AND OTHER DEFORMABLE BODIES.

BACKGROUND OF THE INVENTION

1. Field of the Invention

The present invention generally relates to an apparatus and method of measuring and analyzing the deformation of deformable bodies which includes a source of an electromagnetic or acoustical signal emitted from a deformable body which can be received and analyzed so that the signal can be analyzed when the body is in a reference state with the signal being subsequently analyzed when the body is undergoing or has undergone deformation with the reference state signal and deformation state signal being compared and analyzed to provide significant information with respect to various characteristics of the body.

2. Information Disclosure Statement

All of the prior art cited in the parent applications is made of record herein by reference thereto as is the prior knowledge discussed in the specification in the parent applications.

SUMMARY OF THE INVENTION

An object of the present invention is to provide an apparatus and method for measuring and analyzing deformation of bodies by which significant information can be obtained regarding various characteristics of the bodies by analyzing and comparing a signal received from a body when in a reference state and a signal received from the body when being deformed or when deformation has been completed.

Another object of the invention is to provide an apparatus and method in accordance with the preceding object in which the body or object whose deformation is being measured and analysed can generate and emit its own signal, reflect a signal from an external source, transmit a signal or otherwise produce a signal that can be received with the source of the signal falling anywhere within the electromagnetic spectrum including the visible electromagnetic spectrum as well as an acoustical signal as a source with the received signal including a speckle pattern so that the speckle pattern received from the body when in a reference state can be compared with a speckle pattern received from the body when in a deformed state so that regardless of the source or type of signal and regardless of how the body emits, reflects or transmits the signal, a speckle pattern will be received when the body is in different states for measurement and comparative analysis to provide significant information regarding the characteristics of the body.

A further object of the invention is to provide an apparatus and method in according with the preceding objects which has many end uses with an end use in the medical field being disclosed specifically in this application.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
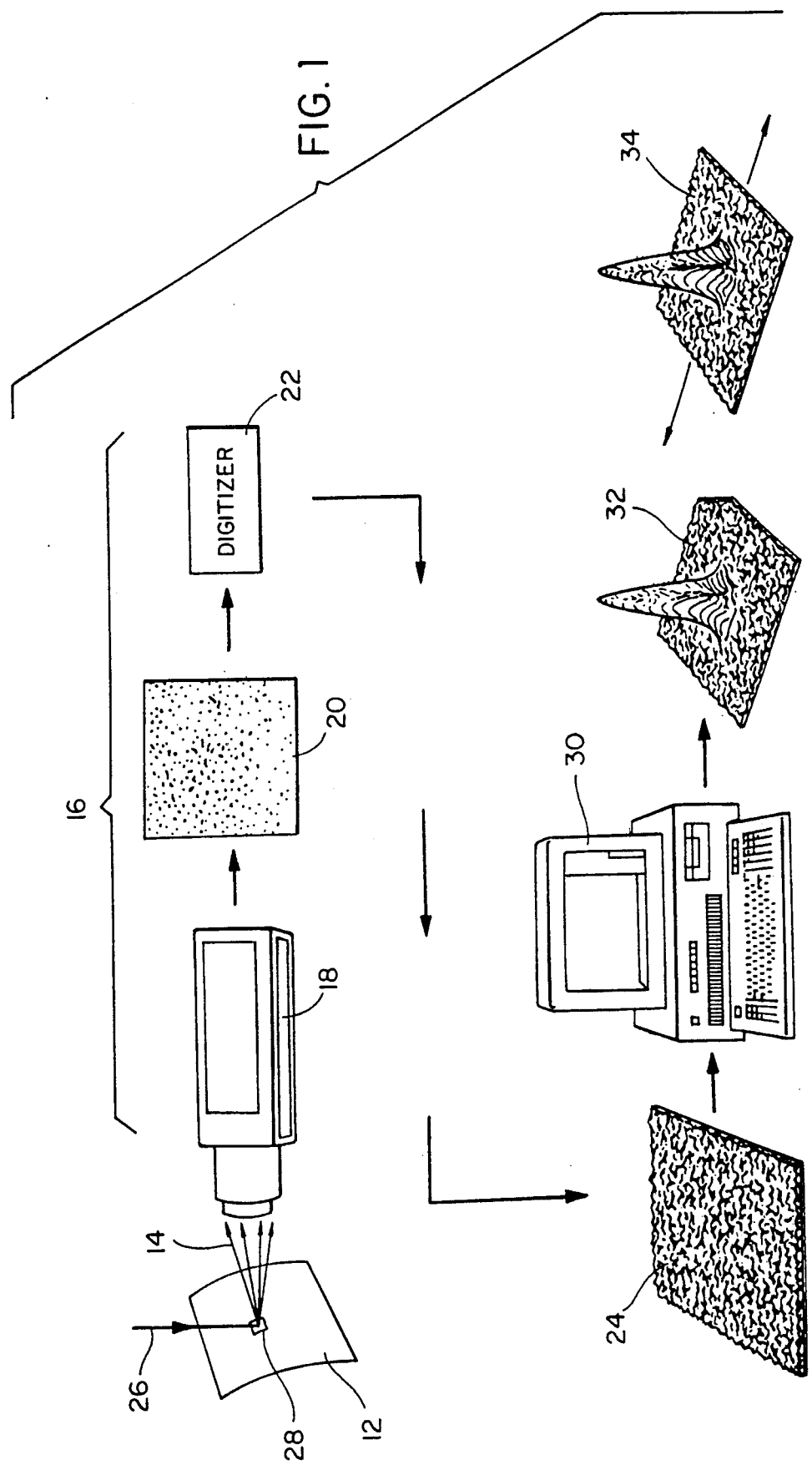
FIG. 1 is a pictorial representation of the apparatus and method of the present invention.

The operational and functional theory on which the present invention is based is disclosed in the parent applications and this material is included herein by reference thereto. FIG. 1 illustrates schematically the apparatus and method of measuring and analyzing deformation of a body, object, surface or other entity which is indicated by reference numeral 12 and illustrated as a surface which will emit, transmit, reflect or otherwise provide a signal or signals 14 received by a digitizer 16 which includes a solid state video camera or other appropriate transducer or the like which senses a speckle pattern 20 which is digitized at 22 to provide a digitized speckle pattern 24. As illustrated, an electromagnetic source such as incident light 26 is directed toward the body 12 and impinges on a critical area 28 so that the signal 14 produces a speckle pattern 20. Thus, the body 12 will provide a speckle pattern when in a reference state and a displaced or altered speckle pattern when in a deformed state so that the displacement or alteration of the speckle patterns can be measured, analyzed and correlated to provide significant information with respect to the properties or characteristics of the body 12.

Figure 2:
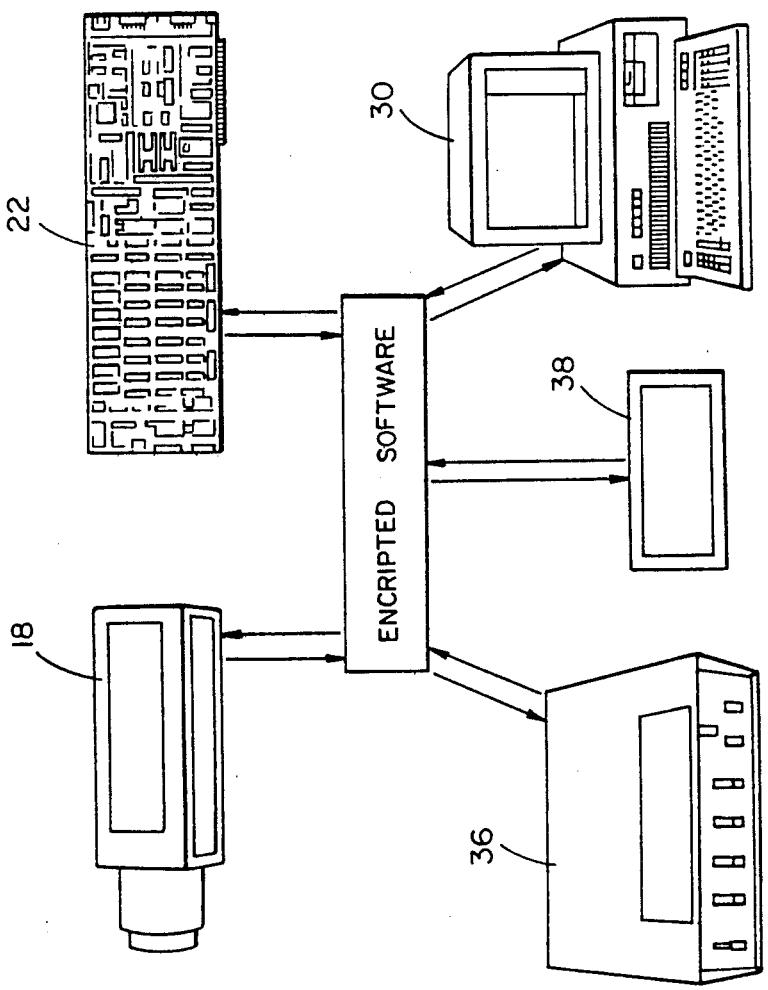
FIG. 2 is a schematic view of components of the invention.

The digitize speckled pattern 24 is input into a computer 30 having particular hardware and software components to translate the digitized signals into a light or amplitude intensity surface 32 which is characteristic of the body or surface 12 at a given instant of time with a subsequent light or amplitude intensity surface being designated by numeral 34 thereby enabling comparison of the light or amplitude intensity surfaces 32 and 34 to determine change in the body or surface 28 to enable various characteristics of the body or surface 28 to be determined such as deformation, displacement, dimensional changes, discontinuity or other characteristics of the body. The components other than the signal source and body are shown schematically in FIG. 2 which illustrates the association of the camera or appropriate transducer 18, digitizer 22, software, computer 30, a power supply 36 and a printer plotter 38 with the components, except the software, being commercially available products.

As indicated previously, the basis of the operation and function of this invention is disclosed in the parent applications. However, in order to provide clear basis for the specific mode of use disclosed in FIG. 3, a synopsis of the operation and function is set forth hereinafter.

As is well known, every non-mirror-like surface will transmit, reflect or emit a characteristic pattern of light and dark spots when illuminated by a source of light with this pattern being termed a "speckle pattern". Changes in the intensity of the signal speckle pattern are contained in certain acoustical signals emitted, reflected from or transmitted from certain surfaces. Each speckle pattern of a surface at a given time describes the condition of the surface at that time. If the surface is placed in a condition of strain, displaced, rotated or the like, sequential speckle patterns, when compared will indicate these changes. The present invention senses each speckle pattern and transmits each pattern as an analog electrical signal from the video camera or appropriate transducer 18 to the digitizer 22 where this signal is digitized. Digitization is a process whereby the analog image is depicted as consisting of a rectangle divided into $512 \times 512$ subrectangles, each of which is referred to as a "pixel" each of which is assigned an integer value proportional to the light intensity received from the image with the numerals being proportional to the light intensity received from the image with the lowest intensity being assigned a zero and the highest intensity being assigned the maximum integer. This scale is known as the graylevel and the present invention translate the integer values of a surface into a mathematical function defined as a light intensity surface designated by numerals 32 and 34 in FIG. 1. Thus, by digitizing first one image and then another and generating a light or amplitude intensity surface (32 and 34) for each image, it is possible to compare the images or light intensity surfaces in great detail and accuracy and numerically evaluate the magnitude or amplitude and direction of any displacement, rotation, distortion, transposition and the like. For example, the invention can detect boundaries between bodies and discontinuities or cracks in surfaces which is an important aspect of the device.

Figure 3:
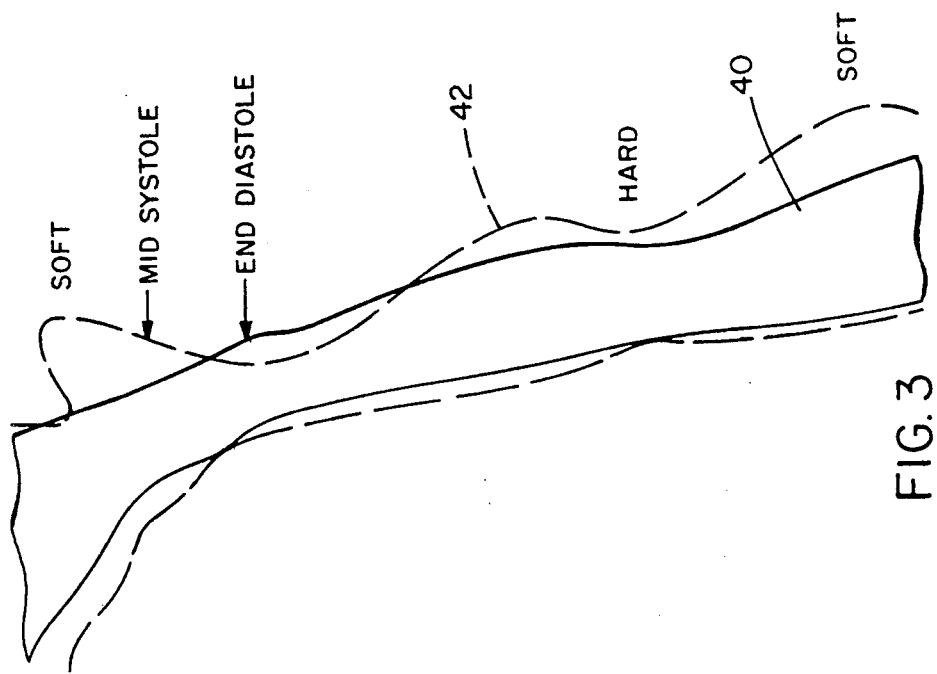
FIG. 3 is a diagrammatic view illustrating the invention used in relation to a coronary artery.

FIG. 3 illustrates schematically a mode of utilizing the present invention in association with a coronary artery 40 in order to plot the boundary of the artery 40, illustrated by the broken lines 42 at the end of diastole and midsystole showing regions of hard and soft plaque.

It is well known that atherosclerotic plaque in coronary arteries is a problem of severe consequencies, the most serious being death. Determination of the status of the plaque in arteries is critical in order to select the proper procedure to be used in alleviating occlusions. Soft plaque in the artery requires a bypass procedure to supply heart tissue with the blood supply. Hard plaque in the artery suggests the insertion of a balloon by way of an arterial catheter in the region of the occlusion and inflation of the balloon which leads to disruption and compression of the plaque and relief of the occlusion. The balloon procedure is termed percutaneous balloon angioplasty. Using current procedures, it is difficult to determine from angiograms the status of the plaque and arteries can have regions of both hard and soft plaque. The use of the balloon procedure in an area of artery having soft plaque may lead to immediate fatal aneurism or thrombosis within a short period of time after the procedure. Statistically, there is approximately a 20% complication rate when using the procedure and 5% to 6% of such complications include myocardial infarction. These percentages vary depending upon the patient with patients having unstable angina having a higher percentage of complications.

The bypass procedure, while life saving can also be life threatening. A bypass connection into a seemingly healthy area of an artery may be a connection into an area unable to provide adequate blood flow due to the tissue of the artery not being sufficiently elastic because of hard plaque or calcifiation which may result in trauma to the heart that it may not survive and if the heart tissue survives the bypass may be ineffective. Currently angiography is employed to determine the presence of plaque and the status of plaque since different corrective actions may be dictated and current techniques are adequate to determine the presence of plaque but are generally inadequate to determine the status of the plaque. In the known procedure, a dye is injected into the artery with the dye being opaque to X-rays which is used to indicate the flow or absence of flow in the artery so that the presence of plaque is seen as a constriction or occlusion in the artery. In endeavoring to determine the status of plaque, the artery is observed during the cycle from diastole to systole with a succession of angiograms revealing the qualitative elasticity of the tissue with any elastic condition indicating soft plaque and any inelastic condition indicating hard plaque. This type of evaluation of elasticity is not exact and cam leave considerable doubt as to the accuracy of the evaluation.

The present invention provides a quantitative evaluation of the elasticity of the artery or tissue containing plaque and reduces the doubt of the cardiologist making the evaluation. A quantitative evaluation is possible as elasticity is related to the rate of strain which is the ratio of the change in dimension of the body to the original dimension per unit of time. Observing the quantitative value in an artery dimension as a ratio to the original quantitative value of the dimension over a given time interval provides elasticity appearing during diastole when the heart fills with blood and the pressure is low whereas in systole the heart contracts and expels blood with the pressure being high. Observing these changes in the artery quantitatively provides elasticity of the tissue.

The present invention enables quantitative determination of the elasticity since the X-ray used in angiography generates a speckle pattern of the region of study at an instant of time. Successive angiograms of a coronary artery from diastole to systole captures not only presence of occlusions but also quantitative dimensional data which can generate quantitative value of tissue elasticity by using the present invention. Elasticity is determined by analyzing the speckle patterns associated with angiograms and relating this information to the status of plaque in the arteries by relating the strain rate of coronary arteries to the tissue composition of these vessels and determine the strain rate of atherosclerotic plaque in coronary arteries and relate this to the histology of the given plaque. Those plaques likely to result in complications are the so-called soft grumous plaques which should have a far different strain rate than firm fibrous plaques. In test uses, angiograms are recorded on film and have been analyzed for patients have undergone balloon angioplasty and the results of the analyses of the angiograms have been substantiated by autopsies in certain instances in patients who have died. The present invention will be associated with the X-ray machine screen, video tape film and the 35 mm. film of the angiogram on a real time basis. In a test, the 35 mm. film was mounted in a microscope and the camera 18 was mounted on the microscope with the speckle pattern of each angiogram being digitized with the remainder of the components determining the elasticity of each region of the artery under study. The indicated regions in FIG. 3 are indicated by the capability of the expansion of the artery occurring in the regions of soft plaque whereas regions of hard plaque in the artery do not expand. In commercial application, the device will perform a real time analysis with the X-ray machine directly or the physician can analyze the 35 mm. file or video tape record.

In addition to use with coronary arteries, the invention is well adapted for use in evaluation of plaque in carotid arteries and the arteries of the extremities, changes in plaque status for patients on long term regimens of medication for angina, effects of medication on heart tissue over a short period of time and evaluation of the suitability of bypass sites in coronary bypass operations. Further, the device can determine the state of tissue in the eye by analyzing the speckle pattern existing in the eye when illuminated.

The use of the present invention is non-invasive and it provides quantitative data to enable a more accurate decision to be made with respect to a corrective procedure or in the case of a bypass, indicate the success of the bypass.

Basically, in the present invention, X-ray images, which are speckle patterns, of the coronary arteries or other arteries can provide data with respect to the change in dimension of the artery in question and thus provide an indication of the elasticity of the artery and the status of the plaque in the artery to enable a better decision to be made as to whether a balloon angioplasty is appropriate to free the artery of an obstruction or occlusion or whether soft plaque is present which dictates a bypass procedure. The present invention determines the change or strain in a body or surface condition based upon correlating sequential images of the body or surface under study. This basic technique may be used for many purposes and speckle patterns can be provided or produced by various arrangements including electromagnetic signals from X-ray, radar, infrared items and the like. The electromagnetic signal may be reflected from the body, transmitted through the body or emitted by the body itself and the same is true for acoustical signal providing a source with the present invention requiring that the speckle pattern produced by the body be detected and received when in a reference state and, if deformed, in a deformed state. The receiving transducer receives the speckle pattern and the digitizer digitizes the pattern to ultimately provide the light or amplitude intensity surface by grayscale interpolation. This technique can be used for various other purposes including the description of velocity fields in fluid in which the source emits a signal that is passed through the fluids which has been seeded to produce a change in the speckle pattern received by the digitizer. The digitized signals or speckle patterns are analyzed to determine the strain or shear in the fluid which in turn describes the velocity field when the data are functions of time.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for determining stress and strain associated with a body, said apparatus comprising:
   means associated with said body to cause said body to produce a speckle pattern;
   data receiving means for sensing a reference speckle pattern and a succeeding speckle pattern produced by the body when undergoing deformation, said data receiving means further serving to digitize signals provided by said reference and succeeding speckle patterns; and
   computation means for mathematically analyzing the amplitude of said digitized signals to determine displacement between the speckle pattern produced by the body in a reference state and the speckle pattern produced by the body when deformed and thereby to determine stress and strain associated with said body.

2. The apparatus for determining stress and strain associated with the body as defined in claim 1, wherein said means to produce a speckle pattern includes means emitting a receivable signal from the body.

3. An apparatus for determining stress and strain associated with a body, said apparatus comprising means associated with said body to cause said body to produce a speckle pattern, data receiving means for sensing a reference speckle pattern and a succeeding speckle pattern produced by the body when undergoing deformation, said data receiving means further serving to digitize signals provided by said reference and succeeding speckle patterns; and computation means for mathematically analyzing the amplitude of said digitized signals to determine displacement between the speckle pattern produced by the body in a reference state and the speckle pattern produced by the body when deformed and thereby to determine stress and strain associated with said body, said means to produce a speckle pattern including means emitting a receivable signal from the body, said data receiving means including a video camera and digitizer to form a digitized speckle pattern, said computation means including a computer for producing a light intensity surface by grayscale interpolation from said digitized signals.

4. The apparatus as defined in claim 3 wherein the means associated with the body to cause the body to produce a speckle pattern includes means producing a signal in a measurable spectrum from the body.

5. An apparatus as defined in claim 4 wherein the body is an artery subject to deformation in response to blood pressure during diastole and systole portions of blood flow through the artery with the reference speckle pattern and succeeding speckle patterns, respectively, indicating soft and hard plaque areas in the artery and providing a change in the quantitative value of the dimension of an artery as a ratio to an original quantitative value of the dimension of the artery over a given time interval, said computation means indicating elasticity of the artery by determining displacement between the reference speckle pattern of the artery during the diastole portion of blood flow and the succeeding speckle pattern of the artery during the systole portion of blood flow.

6. The method of correlating speckle pattern displacement produced by a body undergoing deformation, said method including the steps of utilizing means associated with said body to produce a reference speckle pattern and a succeeding speckle pattern when the body has been deformed, obtaining said reference and succeeding speckle patterns from a transducer means and a data digitizer by respectively digitizing a speckle pattern produced by said body when in a reference state to form a signal in said data digitizer in response to said speckle pattern when the body is in said reference state and said succeeding speckle pattern produced by said body when undergoing deformation to form a signal in said data digitizer in response to said speckle pattern when the body is in a deformed state, receiving said signals in computation means for correlating displacement of said speckle patterns.

* * * * *